United States Patent [19]

Parkinson

[11] 3,986,681

[45] Oct. 19, 1976

[54] CYLINDRICAL MANIFOLD FOR EGD CHANNELS OF A STATIC DISCHARGE SYSTEM

[75] Inventor: Gerald Walter Parkinson, West Haven, Conn.

[73] Assignee: The United States of America as represented by the Secretary of the Navy, Washington, D.C.

[22] Filed: Sept. 15, 1975

[21] Appl. No.: 613,605

[52] U.S. Cl. .............................. 244/1 A; 244/17.11; 317/2 E
[51] Int. Cl.² ..................... B64D 45/02; H01T 19/04
[58] Field of Search ................ 244/1 A, 17.11, 136; 343/701, 705; 317/2 E, 2 F; 239/3, 15, 171, 565, 265.25

[56] References Cited
UNITED STATES PATENTS

| | | | |
|---|---|---|---|
| 123,536 | 2/1872 | Wilkinson | 239/565 X |
| 2,320,146 | 5/1943 | Leake | 244/1 A |
| 3,600,632 | 8/1971 | Bright et al. | 317/2 E |
| 3,650,348 | 3/1972 | Colebrook et al. | 239/265.25 X |

Primary Examiner—Trygve M. Blix
Assistant Examiner—Barry L. Kelmachter
Attorney, Agent, or Firm—R. Sciascia; R. Beers; S. Sheinbein

[57] ABSTRACT

A cylindrical discharge manifold for an electrostatic gas-dynamic discharge system in a helicopter comprising four symmetrically positioned air outlets set in the end of a tubular manifold casing which protrudes out from the helicopter fuselage. The outlets connect to a central high-velocity air-stream inlet pipe in the casing by way of a plurality of air passages extending radially outward from the central inlet pipe. This manifold design insures a symmetrical air distribution, significantly reduces drag pressure on the aircraft, and obviates the requirement for "Y" air hose connections.

4 Claims, 5 Drawing Figures

SEED INTAKE
ATOMIZED LIQUID
PARTICLES

HI-VOLTS 10
13
12

JETS
ION DISCHARGE

MANIFOLD    (SECTION)

VENTURI DISCHARGE JETS

PRIOR ART

CYLINDRICAL MANIFOLD FOR EGD CHANNELS OF A STATIC DISCHARGE SYSTEM

BACKGROUND OF THE INVENTION

1. Field of Invention

The present invention relates generally to discharge manifolds and more particularly to manifolds for electrostatic gas-dynamic static discharge systems.

2. Description of the Prior Art

The problems of electrostatic, or triboelectric and atmospheric charging of an aircraft during flight is well known. The charge may be built-up by the friction of the air along the body of the aircraft, or by the blades of a propeller-driven aircraft, or by the rotors of a helicopter during flight. This charging process, together with inductive charging due to large scale atmospheric magnetic and electrical fields, has caused a problem of long standing.

As in the case of electrostatic charges, the low capacitance of the aircraft with respect to ground and the very effective insulation of the air between the aircraft and ground make extremely high potential gradients possible and result in electrostatic charges of extremely high voltages.

Generally, these built-up electrostatic charges are discharged as the wheels of the descending aircraft touch the ground and, in the case of an aircraft coming into an open runway, present no serious hazard. However, in the case of helicopters, hovering very close to ground, and dropping down cargo-hook cables, during loading and unloading, there is a very real danger of severe bodily injury if personnel come in contact with the helicopter or its cargo hooks. Even if there is no direct contact, there is still a danger of arc-over if the cable is brought too close to ground.

An electrostatic gas dynamic discharge system has been developed to meet this problem. It operates generally as shown in FIG. 1. A liquid is broken down into a minute particle vapor (analogous to the fine spray from an atomizer). These minute particles are then added to a high velocity air-stream. This particle impregnated air-stream is conducted through the channel 10 and deflected so that it flows over a high voltage electrode 12 which is connected through a power supply to the aircraft fuselage. The constricted ring 13 is a ring electrode set at ground potential. The high voltage electrode 12 in combination with the ring electrode 13 set up a high electric field region wherein ionic charges are injected into the airstream. The seed vapor flowing through this high field region condenses around these injected charges, forming charged particles with diameters ranging up to 1 micron. These charged liquid particles are carried along in the airflow of the high velocity airstream through a discharge opening out away from the helicopter.

It is important that the flow from the discharge manifold outlets be symmetrical in order to prevent electrostatic breakdown at low voltage. Such a breakdown could occur at an outlet if the air flow to that outlet was less than the flow to the other outlets. This is because the particle impregnated air flowing through the high field region draws a current therefrom thus lowering the charge build-up in the region. As the velocity of the air flow increases, the current that can be drawn increases, and thus the voltage that can be applied without arcing increases. But, if the air flow for one outlet is decreased without an attendant decrease in the voltage applied to its electrode, then electrostatic breakdown occurs.

The prior art design of the discharge manifold is shown in FIG. 2. In order to obtain the symmetrical flow to the manifolds 14, two air hoses with a "Y" connection 16 must be utilized. The rectangular shape of the manifold block 18 causes a high drag pressure on the aircraft.

SUMMARY OF THE INVENTION

The present invention comprises a cylindrical manifold with radially located air passages symmetrically positioned in the protruding end of the manifold casing. This manifold design obviates the need for a "Y" air feed, it significantly reduces the drag pressure on the manifold casing, and is easily mounted and secured.

OBJECTS OF THE INVENTION

An object of the present invention is to reduce the drag on the discharge manifold for an EGD static discharge system.

A further object of the present invention is to obviate the need for a "Y" air feed connection in an EGD static discharge system.

A still further object is to insure a symmetric air flow from the outlets from an electrostatic gas-dynamic discharge manifold.

Other objects, advantages, and novel features of the present invention will become apparent from the following detailed description of the invention when considered in conjunction with the accompanying drawings.

BRIEF DESCRIPTION OF THE DRAWINGS

FIG. 1 is a schematic diagram of a single channel for an EGD static discharge system.

FIG. 2 is a typical prior art discharge manifold design for an EGD static-discharge system.

FIG. 3b is a schematic side view of the discharge manifold of FIG. 3a.

DETAILED DESCRIPTION OF THE INVENTION

Figure 3B:
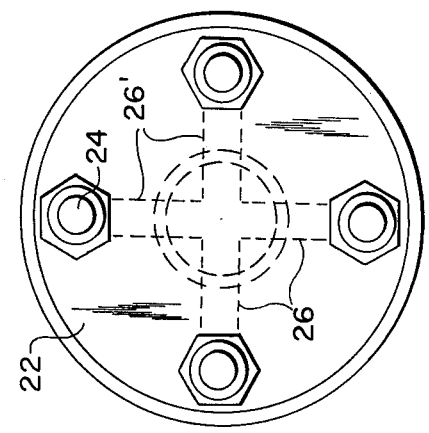
Figure 3A:
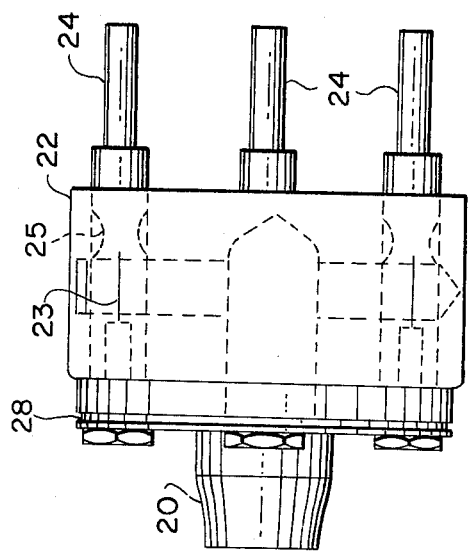
FIG. 3a is a front view of the cylindrical discharge manifold of the present invention.

FIGS. 3a and 3b show the manifold design of the present invention. An air inlet pipe 20 channels a high velocity air stream impregnated with seed particle vapor into a cylindrical casing 22. A plurality of outlet pipes 24 extend from the end of the cylindrical casing. These outlet pipes 24 are symmetrically set radially around the central axis of the cylindrical casing as can be seen from FIG. 3a. An air passage 26 extends radially outward from the central air inlet pipe 20 in a symmetrical fashion to evenly distribute the high velocity air from the inlet 20 to each of the outlet pipes 24.

The high voltage electrode 23 set in each outlet pipe 24 in combination with its adjacent positioned constricted ring electrode 25 (which is set to ground potential) form a high electric field region within the manifold outlet pipes 24 which functions to inject charged particles into the airstream. The seed vapor flowing through this high-field region condenses around these charged particles. These charged liquid particles are then carried by the high velocity air-stream through the tubular outlets 24 away from the helicopter body.

This tubular manifold is simple of design and easily constructed. The cylindrical design allows it to be readily sealed in a variety a ways. For example, the manifold could be sealed with O-rings or ring clamps, it could be screwed into position, or, it could be secured via clips similar to servo-mounts. This sealing flexibility is a substantial improvement over the rectangular seal required for rectangular fittings. A groove 28 may be specially formed in the casing to hold the O-ring seal if that sealing technique is utilized.

This design not only insures a symmetrical air flow from the discharge outlets 24, but also significantly reduces drag pressure over prior art designs due to its compact cylindrical shape.

Although the manifold of FIGS. 3*a* and 3*b* have only four discharge outlet pipes 24, this design could easily be extended to six or more discharge outlets.

Figure 4:
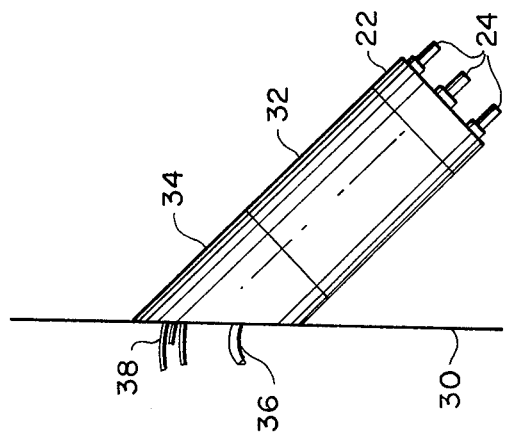
FIG. 4 is a schematic view of the discharge manifold of the present invention positioned on the fuselage of an aircraft.

FIG. 4 shows a side view of one possible method of positioning the discharge manifold on the fuselage of an aircraft. The line 30 represents the skin of the aircraft fuselage. The manifold 22 is attached via any of the aforementioned techniques to a tubular insulator 32 which positions the manifold away from the electrically conductive part of the fuselage. The tubular insulator is, in turn, connected to a support bracket 34 which protrudes from the fuselage skin 30. An air hose 36 feeds high-velocity seed impregnated air to the central inlet pipe of the manifold 22. The wires 38 conduct the high voltages built-up on the fuselage to the electrodes extending into the air passages of manifold.

Obviously, many modifications and variations of the present invention are possible in light of the above teachings. It is therefore to be understood that, within the scope of the appended claims, the invention may be practiced otherwise than as specifically described.

What is claimed is:

1. A discharge manifold for an electrostatic, gas, dynamic discharge system comprising:

cylindrical casing means extruding from the fuselage of an aircraft, said casing means having a central air inlet which is adapted to connect to the high-velocity air-stream channel of an electrostatic, gas, dynamic discharge system in said aircraft;

a plurality of air outlet means symmetrically inset in the extruding end of said manifold means;

a plurality of radial air-passage means connecting said central air inlet to said plurality of air outlet means for providing a symmetrical flow of air thereto;

high voltage electrode means extending into the flow of air from said radial air-passage means; and ground potential electrode means set in said air outlet means adjacent to said high voltage electrode means for setting up a high electric field region through which said air flow must pass.

2. A discharge manifold as defined in claim 1, wherein said aircraft is a helicopter.

3. A discharge manifold as defined in claim 1 wherein said high voltage electrode means is connected to the fuselage of said aircraft.

4. A discharge manifold for an electrostatic, gas dynamic discharge system comprising:

cylindrical casing means extruding from the fuselage of an aircraft, said casing means having a central air inlet which is adapted to connect to the high-velocity air-stream channel of an electrostatic, gas, dynamic discharge system in said aircraft;

a plurality of air outlet means symmetrically inset in the extruding end of said manifold means;

a plurality of radial air-passage means connecting said central air inlet to said plurality of air outlet means for providing a symmetrical flow of air thereto;

high voltage electrode means extending into the flow of air from said radial air-passage means; and constricted ring-electrode means set in said air outlet means adjacent to said high voltage electrode means for setting up a high electric field region through which said air flow must pass.

* * * * *